United States Patent
Kapoor

(10) Patent No.: US 7,689,903 B2
(45) Date of Patent: Mar. 30, 2010

(54) UNIFIED MARKUP LANGUAGE PROCESSING

(75) Inventor: Rohit V. Kapoor, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 11/085,880

(22) Filed: Mar. 22, 2005

(65) Prior Publication Data

US 2006/0218511 A1   Sep. 28, 2006

(51) Int. Cl.
*G06F 17/00* (2006.01)

(52) U.S. Cl. ..................................... 715/234

(58) Field of Classification Search ................ 715/513, 715/517, 700, 234, 243
See application file for complete search history.

(56) References Cited

U.S. PATENT DOCUMENTS

| | | | | |
|---|---|---|---|---|
| 6,549,944 | B1 | 4/2003 | Weinberg et al. | 709/224 |
| 7,185,049 | B1* | 2/2007 | Benitez et al. | 709/203 |
| 7,308,646 | B1* | 12/2007 | Cohen et al. | 715/234 |
| 7,363,578 | B2* | 4/2008 | Bendsen et al. | 715/236 |
| 7,386,789 | B2* | 6/2008 | Chao et al. | 715/239 |
| 2002/0023110 | A1* | 2/2002 | Fortin et al. | 707/513 |
| 2002/0156815 | A1 | 10/2002 | Davia | 707/517 |
| 2002/0161674 | A1* | 10/2002 | Scheer | 705/28 |
| 2002/0198842 | A1* | 12/2002 | Kurtz et al. | 705/51 |
| 2003/0080998 | A1* | 5/2003 | Gonzalez | 345/751 |
| 2003/0182627 | A1* | 9/2003 | Chung et al. | 715/513 |
| 2003/0212987 | A1* | 11/2003 | Demuth et al. | 717/130 |
| 2003/0229851 | A1* | 12/2003 | Willumeit et al. | 715/513 |
| 2004/0061713 | A1* | 4/2004 | Jennings | 345/700 |
| 2004/0133854 | A1* | 7/2004 | Black | 715/517 |
| 2004/0172589 | A1* | 9/2004 | Small | 715/502 |
| 2004/0230903 | A1* | 11/2004 | Elza et al. | 715/513 |
| 2004/0250200 | A1* | 12/2004 | Chung et al. | 715/500 |
| 2004/0268229 | A1* | 12/2004 | Paoli et al. | 715/508 |
| 2005/0044490 | A1* | 2/2005 | Massasso et al. | 715/517 |
| 2006/0184874 | A1* | 8/2006 | Kimiya | 715/513 |
| 2007/0061708 | A1* | 3/2007 | Kothari et al. | 715/515 |
| 2008/0187113 | A1* | 8/2008 | Adamczyk et al. | 379/88.23 |

FOREIGN PATENT DOCUMENTS

JP        2003150377        5/2003

OTHER PUBLICATIONS

Coles et al., A Framework for Coordinated Multi-Modal Browsing with Multiple Clients, ACM 2003, pp. 718-726.*

(Continued)

*Primary Examiner*—Cong-Lac Huynh
(74) *Attorney, Agent, or Firm*—Joseph E. Bracken, Esq.; Steven M. Greenberg, Esq.; Carey, Rodriguez, Greenberg & Paul, LLP

(57) ABSTRACT

A method, system, architecture and apparatus for unified markup language processing. A unified markup language processing and distribution system includes a unified language markup parser configured to produce both a layout model and an execution model based upon content defined by a unified markup language. A layout engine may be included that is programmed to process the layout models produced by the parser to generate corresponding user interfaces for an application defined by the content. An execution engine may be programmed to process execution models produced by the parser to generate corresponding logic for the application defined by the content.

15 Claims, 2 Drawing Sheets

OTHER PUBLICATIONS

Perugini et al., Enhancing Usability in CITIDEL: Multimodal, Multilingual, and Interactive Visualization Interfaces, ACM 2004, pp. 315-324.*

Bayerl et al., Methods for the Semantic Analysis of Document Markup, ACM 2003, pp. 161-170.*

Babaie et al., Modeling Geological Objects with the XML Schema, Google 2005, pp. 1135-1150.*

Schattkowsky et al., UML Model Mappings for Platform Independent User Interface Design, Google 2006, pp. 201-209.*

Pontelli, E. et al. "A Domain Specific Language Framework for Non-Visual Browsing of Complex HTML Structures", in ASSETS'00, pp. 180-187, Nov. 2000.

Fratemali, "Tools and Approaches for Developing Data-Intensive Web Applications: A Survey" in ACM Computing surveys, vol. 31, No. 3, pp. 227-241, Sep. 1999.

* cited by examiner

UNIFIED MARKUP LANGUAGE PROCESSING

BACKGROUND OF THE INVENTION

1. Field of the Technical Invention

The present invention relates to markup language processing. More particularly, the present invention relates to managing user interface layout instructions and executable logic in a markup language driven application.

2. Description of the Related Art

Traditional graphical user interface (GUI) driven applications mix presentation and application logic in a single distribution. In contrast, where an application is to be distributed about a computer communications network, generally the GUI interface elements and computing logic can remain separate with the GUI interface having a markup language definition, and the logic having an executable or interpretable form which can be accessed through an externally callable interface. In some instances, the logic can be mixed with the markup language definition in the form of embedded scripts to be processed either in the client computing device or in the application server.

To force a separation of the presentation and logic layers as is preferred among many contemporary computer scientists, server page technologies have become the preferred vehicle for multi-tier applications. Server page technologies release the client tier from the responsibility of processing logic for rendering the presentation layer. Moreover, server pages largely separate presentation layer logic from the static elements of the presentation layer so that user interface designers can perform changes to the static elements of the presentation layer without breaching the integrity of the programmatic elements of the presentation layer.

Typical server page technologies permit a mixing of statically defined user interface elements and programmatic scripts in a single document. The programmatic scripts can be processed server-side to produce a translated presentation layer document. The translated presentation layer document can be delivered to the client side where the translated presentation layer document can be rendered to a user interface. Notably, in addition to embedded programmatic scripts, the server page further can include macro references to externally defined programmatic logic. In this way, the complexity of the programmatic logic can be hidden from the view of the user interface designer charged with the development and maintenance of the server page.

As it will be apparent to the skilled artisan, application interface layout and program execution remain separate functions requiring separate languages and sometimes files—though in some cases both can be mixed within the same document. Consequently, maintaining an application of this sort can be cumbersome and expensive as different experts are required to maintain different portions of an application. Markup language specialists mostly are equipped to manage the user interface definition, while computer programmers maintain the logic. To the extent that the rapid development of an application is desired, there presently is no unified layout and scripting language that provides a simple vehicle for developing both the user interface and program logic of an application through the use of a single programming language by a single expert.

SUMMARY OF THE INVENTION

The present invention addresses the deficiencies of the art in respect to processing the rendering of a user interface layout and executable logic associated with a markup language driven application and provides a novel and non-obvious method, system, architecture and apparatus for unified markup language processing. A unified markup language processing and distribution system can include a unified language markup parser configured to produce both a layout model and an execution model based upon content defined by a unified markup language. The system further can include a layout engine programmed to process layout models produced by the parser to generate corresponding user interfaces for an application defined by the content. Finally, the system can include an execution engine programmed to process execution models produced by the parser to generate corresponding logic for the application defined by the content.

A method for processing and distributing unified markup language documents can include parsing a unified markup language document to identify both presentation layer components and logic layer components. Separate layout and execution models corresponding to the identified presentation and logic layer components, respectively, can be written and a user interface can be generated based upon the layout model. Finally, the user interface can be distributed about a computer communications network. Preferably, the method also can include the step of processing the execution model to respond to received events. In this regard, the method can include configuring an event handler to respond to events received from the computer communications network, and routing received ones of the events in the event handler to logic defined by the execution model.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DESCRIPTION OF THE PREFERRED EMBODIMENTS

The present invention is a method, system and apparatus for distributing and processing unified markup language driven applications. In accordance with the inventive arrangements, an application including both its interface layout and execution engine can be defined by a single markup language. A markup parser can separate the interface layout markup from the execution markup to produce both a layout model and an execution model. Subsequently, a unified markup language interpreter can produce a layout model and a separate execution model. In this regard, a layout engine can process the layout model to generate the user interface for the application. An execution engine, by comparison, can process the execution model to generate the logic for handling events occurring in the application through the user interface.

More specifically, the layout engine can generate the requisite user interface displays for the application based upon the content of the layout model. For example, the layout engine can be produce appropriate markup for rendering a user interface in a markup language browser. Similarly, logic for the application can be processed in the execution engine based upon the execution model which can remain separate from the user interface. To unify the operation of the user interface and the application logic, an event handler can be included with the application such that events occurring in the user interface can be handled and routed to the logic managed by the execution engine. In this way, a separation of logic and presentation can be maintained though an application can be created using a single markup language thereby obviating the need for multiple expert developers.

Figure 1:
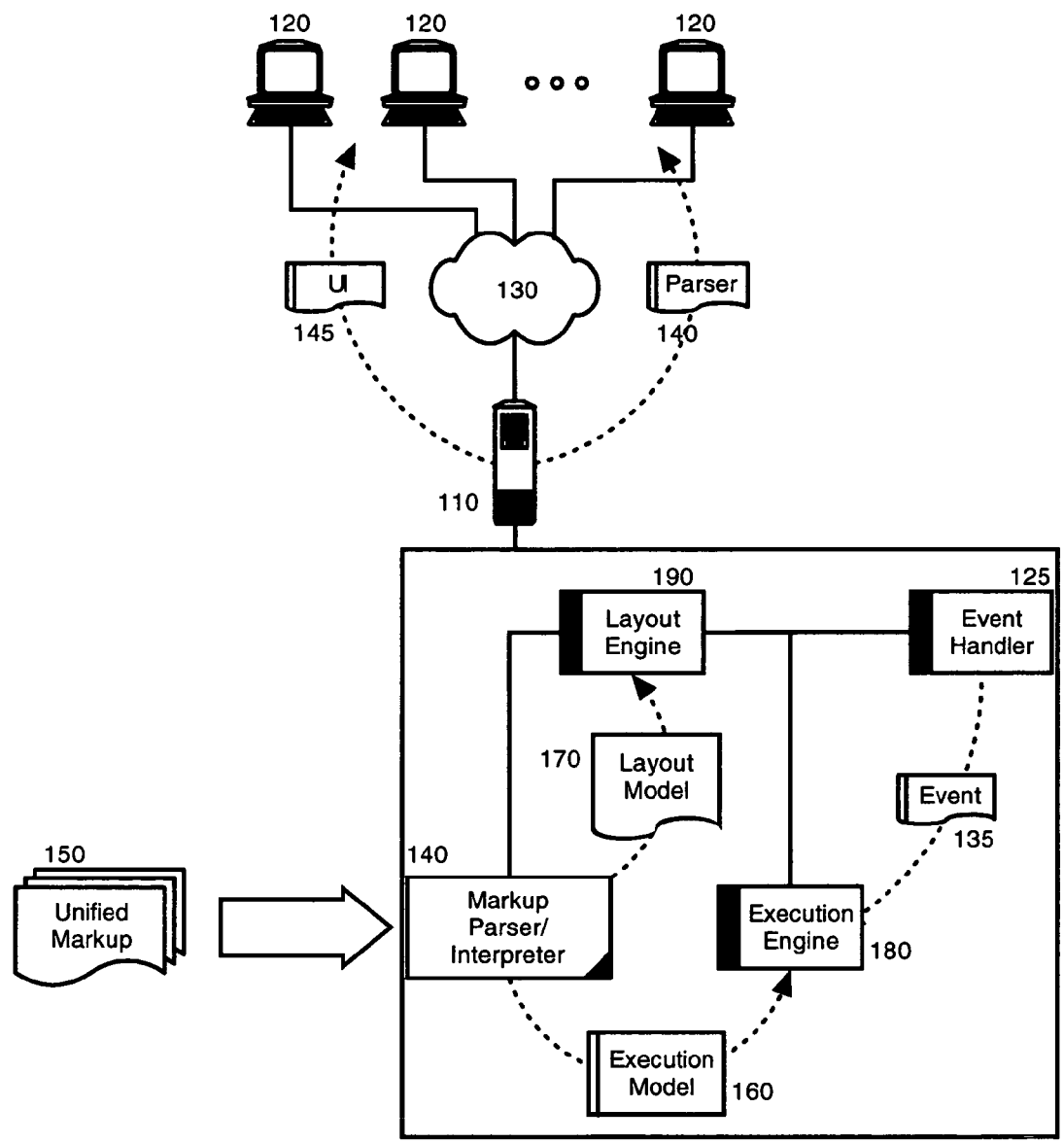
FIG. 1 is a schematic illustration of a unified markup language processing and distribution system.

In further illustration of the principles of the present invention, FIG. 1 is a schematic illustration of a unified markup language processing and distribution system. The system can include an application server 110 configured for serving markup to application clients 120 over a computer communications network 130. A unified markup language parser 140 can be configured in the system for use in application clients 120. The unified markup language parser 140 distributed to the application clients 120 for use within the application clients 120, or the unified markup language parser 140 can be hosted within the application server 110.

In any case, the unified markup language parser 140 can be programmed to recognize markup language elements in a unified markup language document 150. In this regard, unified markup 150 can be served to the application clients 120 in a native format using an application server 110. The markup language elements can specify both presentation layer and logic layer elements. Specifically, the presentation layer elements can define a user interface to an application, while the logic layer elements can define computing logic which can be accessed through the user interface defined by the presentation layer elements. In any case, the unified markup language parser 140 can generate a layout model 170 and an execution model 160 based upon the parsed contents of the unified markup language document 150.

Preferably, a layout engine 190 and an execution engine 180 can be disposed within or associated with the markup language processor 140. The layout engine 190 can be programmed to process the layout model 170 produced by the unified markup language parser 140 to generate a user interface document 145. The user interface document 145 in turn can be process within rendering ones of the clients 120. The execution engine 180, by comparison, can be programmed to process the execution model 160 produced by the unified markup language parser 140 to generate program logic for handling events 135 generated through the user interface document 145. Finally, an event handler 125 can be communicatively linked to the execution engine 180 and programmed to route the events 135 to the execution engine 180.

Figure 2:
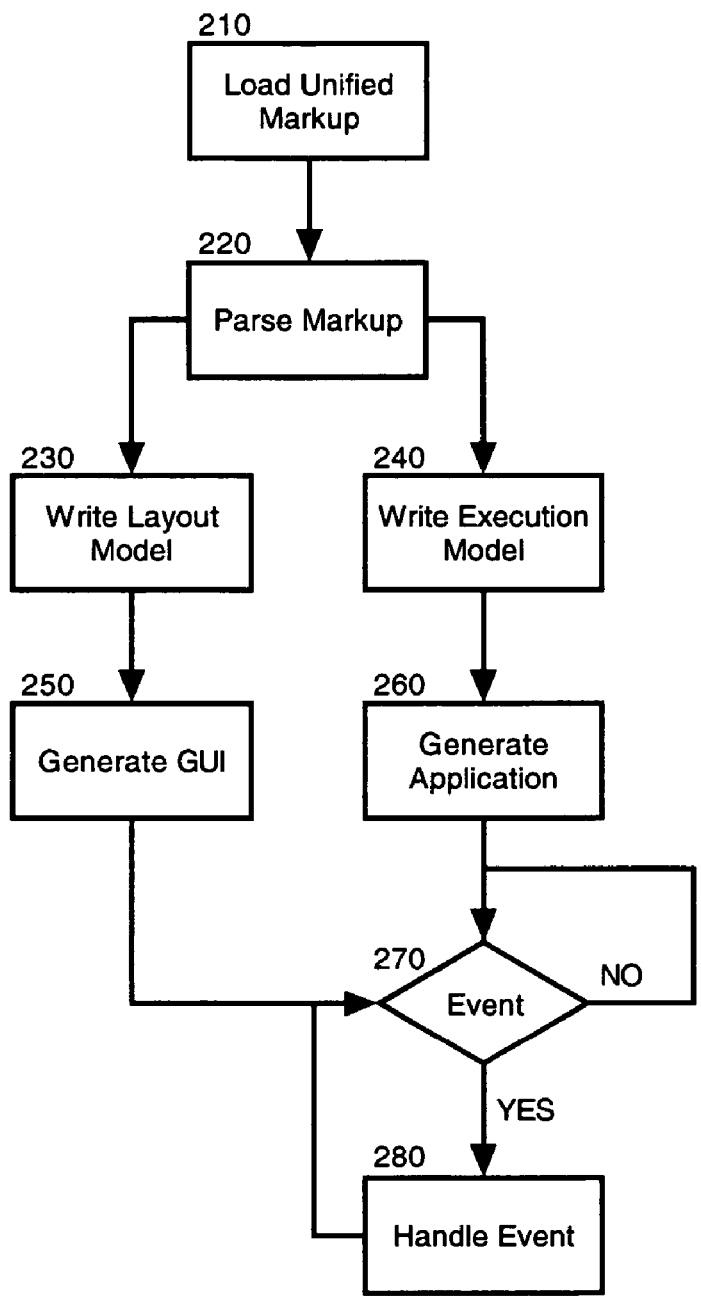
FIG. 2 is a flow chart illustrating a unified markup language processing and distribution method.

FIG. 2 is a flow chart illustrating a unified markup language processing method for use in the system of FIG. 1. Beginning in block 210, a unified markup language document can be loaded for processing. The unified markup language document can include markup which defines both the presentation and logic layer of an application through a specification defined by a single markup language. Importantly, as compared to a server page, the unified markup language document does not incorporate mixed language types to define the presentation and logic layer of the application.

In block 220, the markup contained within the unified markup language document can be parsed so as to separate markup fragments directed to the presentation layer and markup fragments directed to the logic layer. As such, in block 230 a layout model can be written based upon the parsed markup fragments directed to the presentation layer. Concurrently, in block 240 an execution model can be written based upon the parsed markup fragments directed to the logic layer. In block 250, responsive to a request by one or more client computing processes, a graphical user interface (GUI) can be generated based upon the layout model. Preferably, the graphical user interface can be generated through the transformation of the layout model into conventional visual markup such as the hypertext markup language (HTML).

Once the GUI has been generated, the graphical user interface can be rendered in the requesting clients and, in block 260 application logic can be generated for the application defined by the layout model and the execution model. Once the application logic has been generated, in decision block 270, it can be determined whether an event has been received in an event handler based upon the operation of the application and user interactions with the distributed GUI. When an event is received, in block 280 the event can be handled by calling the requisite logic in the generated application. The process of FIG. 2 can continue until the termination of the application.

It will be recognized by the skilled artisan that in consequence of the unification of the definition of the presentation layer and the logic layer in a single markup language can achieve several advantages not previously attainable in processing mixed-language markup such as HTML and Javascript. In particular, new GUI based applications can be easier to create in the same way that mere novices can create simple Web pages. Moreover, as the system of invention includes interpretive processing of the models, GUI applications written using the unified markup language are much easier to maintain, modify and update. Finally, different sets of development experts are not required to generate an application as would be the case with mixed-language markup. Rather, only one familiar with the unified markup language will be required to generate an application.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A unified markup language processing and distribution system, said system comprising:
   a computer system with processor and memory;
   a unified language markup parser executing in the memory by the processor of the computer system and configured to produce both a layout model and an execution model based upon content defined by a unified markup language;
   a layout engine coupled to the parser in the memory and programmed to process layout models produced by said parser to generate corresponding user interfaces for an application defined by said content; and
   an execution engine coupled to the parser in the memory programmed to process execution models produced by said parser to generate corresponding logic for said application defined by said content.

2. The unified markup language processing and distribution system of claim 1, said system further comprising an event handler configured to route events produced in said application to said execution engine for processing by said corresponding logic for said application.

3. The unified markup language processing and distribution system of claim 1, wherein said parser, said layout engine, and said execution engine are disposed within an application server.

4. The unified markup language processing and distribution system of claim 1, wherein said user interfaces comprise markup language documents specifying a visual user interface.

5. The unified markup language processing and distribution system of claim 4, wherein said markup language documents are hypertext markup language (HTML) documents.

6. A computer-implemented method for processing and distributing unified markup language documents, said method comprising the steps of:
   parsing a unified markup language document to identify both presentation layer components and logic layer components;
   writing separate layout and execution models corresponding to said identified presentation and logic layer components, respectively;
   generating a user interface based upon said layout model; and
   distributing said user interface about a computer communications network.

7. The computer-implemented method for processing and distributing unified markup language documents according to claim 6, said method further comprising the step of processing said execution model to respond to received events.

8. The computer-implemented method for processing and distributing unified markup language documents according to claim 6, said method further comprising the steps of:
   configuring an event handler to respond to events received from said computer communications network; and
   routing received ones of said events in said event handler to logic defined by said execution model.

9. The computer-implemented method for processing and distributing unified markup language documents according to claim 6, wherein said generating step comprises the sub-steps of:
   creating a markup language document specifying a visual user interface; and,
   transmitting said created markup language document to requesting clients over said computer communications network.

10. The computer-implemented method for processing and distributing unified markup language documents according to claim 9, wherein said creating sub-step further comprises creating a hypertext markup language (HTML) document specifying a Web page.

11. A machine readable storage having stored thereon a computer program for processing and distributing unified markup language documents, the computer program comprising a routine set of instructions which when executed by a machine cause the machine to perform the steps of:
   parsing a unified markup language document to identify both presentation layer components and logic layer components;
   writing separate layout and execution models corresponding to said identified presentation and logic layer components, respectively;
   generating a user interface based upon said layout model; and
   distributing said user interface about a computer communications network.

12. The machine readable storage of claim 11, wherein the computer program further comprises a routine set of instructions for causing the machine to further perform the step of processing said execution model to respond to received events.

13. The machine readable storage of claim 11, wherein the computer program further comprises a routine set of instructions for causing the machine to further perform the steps of:
   configuring an event handler to respond to events received from said computer communications network; and
   routing received ones of said events in said event handler to logic defined by said execution model.

14. The machine readable storage of claim 11, wherein the computer program further comprises a routine set of instructions for causing the machine to further perform the steps of:
   creating a markup language document specifying a visual user interface; and
   transmitting said created markup language document to requesting clients over said computer communications network.

15. The machine readable storage of claim 14, wherein said creating step further comprises creating a hypertext markup language (HTML) document specifying a Web page.

* * * * *